(12) United States Patent
Park et al.

(10) Patent No.: US 8,195,252 B2
(45) Date of Patent: Jun. 5, 2012

(54) INPUT DEVICE FOR MOBILE TERMINAL USING SCROLL KEY

(75) Inventors: Kyung Min Park, Incheon (KR); Il Lyoo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 873 days.

(21) Appl. No.: 11/945,883

(22) Filed: Nov. 27, 2007

(65) Prior Publication Data

US 2008/0125182 A1 May 29, 2008

(30) Foreign Application Priority Data

Nov. 28, 2006 (KR) ........................ 10-2006-0118394

(51) Int. Cl.
*G06F 3/033* (2006.01)
*H04M 1/00* (2006.01)

(52) U.S. Cl. ..................... 455/575.1; 455/566; 715/786; 345/184

(58) Field of Classification Search .... 455/550.1–575.9; 345/160–173; 715/784–786
See application file for complete search history.

(56) References Cited

U.S. PATENT DOCUMENTS

| | | | | |
|---|---|---|---|---|
| 2003/0142137 A1* | 7/2003 | Brown et al. | .................. | 345/786 |
| 2005/0225531 A1* | 10/2005 | Cheng | ............................ | 345/163 |
| 2006/0001657 A1* | 1/2006 | Monney et al. | ............... | 345/184 |
| 2006/0044272 A1* | 3/2006 | Koo et al. | ...................... | 345/163 |
| 2006/0103633 A1* | 5/2006 | Gioeli | ............................ | 345/173 |
| 2007/0017983 A1* | 1/2007 | Frank et al. | .................... | 235/385 |
| 2008/0034319 A1* | 2/2008 | Hawkins | ....................... | 715/784 |
| 2008/0060925 A1* | 3/2008 | Weber et al. | .................. | 200/341 |

FOREIGN PATENT DOCUMENTS

| | | |
|---|---|---|
| CN | 1402112 | 3/2003 |
| KR | 1020050056448 | 6/2005 |
| KR | 1020050108736 | 11/2005 |

* cited by examiner

*Primary Examiner* — Kent Chang
*Assistant Examiner* — Kashif Siddiqui
(74) *Attorney, Agent, or Firm* — Lee, Hong, Degerman, Kang & Waimey

(57) ABSTRACT

The present invention is related to an input device for a mobile terminal. The input device of the present invention comprises a rotatable scroll key providing rotational information based on movement of the scroll key, a sensing device for sensing a position of a user's finger relative to the scroll key and providing sensing information based on the sensed position of the user's finger, and a controller for receiving the rotational information and sensing information, and controlling the mobile terminal based on the received rotational information and sensing information.

22 Claims, 9 Drawing Sheets

INPUT DEVICE FOR MOBILE TERMINAL USING SCROLL KEY

CROSS-REFERENCE TO RELATED APPLICATIONS

Pursuant to 35 U.S.C. §119(a), this application claims the benefit of earlier filing date and right of priority to Korean Application No. 10-2006-0118394, filed on Nov. 28, 2006, the contents of which are hereby incorporated by reference herein in their entirety.

FIELD OF THE INVENTION

The present invention relates to an input device for a mobile communication terminal, and more particularly, to an input device for conveniently controlling the mobile communication terminal using a scroll key.

BACKGROUND OF THE INVENTION

In general, as mobile communication devices, such as mobile telephones and personal digital assistants (PDAs), have developed, text information, image information or games have been provided to users in addition to voice information. Recent mobile communication devices have included an audio player function for reproducing an audio file such as an MP3 file, a digital camera function for photographing a still picture or moving picture, and a radio or television broadcast reception function. The mobile communication devices have come into wide use and thus have become necessities of life.

Referring to FIG. 1, a general mobile communication device currently being used includes an input device 10 for inputting a signal to control the device and a display 25 for outputting visual information to a user. The device shown in FIG. 1 is a folder-type device. The input device 10 is provided in a main body portion A and the display 25 is provided in a folder portion B.

The input device 10 includes up, down, left and right directional keys 11 for changing the direction of a cursor when selecting a menu, function keys 12 for performing a call, accessing a phone book and utilizing a camera, for example, and character keys 13 for inputting numerals, characters and symbols. The user presses the directional keys 11 to move the cursor to a desired menu and presses a confirmation key to perform a function of the desired menu.

As shown in FIG. 2, a controller 22 of the mobile communication device receives an input value of the input device 10 and analyzes a control command corresponding to the input value using key map data stored in a memory 24. Then, the controller 22 reads a driving program corresponding to the analyzed control command from the memory 24 and executes a function selected by the user. Thereafter, the result of executing the driving program is displayed on the display 25.

However, such a mobile communication terminal has the following problems. First, when a desired function is executed, it is troublesome for the user to repeatedly press the directional keys 11 to move the cursor. In addition, when the user uses a file viewer function in order to view an electronic book or picture, if an output size of a file is larger than that of the display 25, it is troublesome for the user to press the directional keys 11 a number of times to move the output screen of the display 25 in a relative direction to view the portion of the electronic book or picture not previously shown on the display 25.

SUMMARY OF THE INVENTION

The present invention relates to an input device for controlling a mobile communication terminal using a scroll key. Accordingly, the present invention is directed to an input device for a mobile terminal, a mobile communication terminal using the same, and a method of controlling the mobile terminal that substantially obviate one or more problems due to limitations and disadvantages of the related art.

An object of the present invention is to provide an input device for a mobile terminal capable of allowing a user to easily move a cursor or an output screen of a display in all directions using a scroll key. Another object of the present invention is to provide a method of controlling a mobile terminal capable of allowing a user to easily move a cursor or an output screen of a display in all directions using a scroll key.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an input device for a mobile terminal comprises a rotatable scroll key providing rotational information based on movement of the scroll key, a sensing device for sensing a position of a user's finger relative to the scroll key and providing sensing information based on the sensed position of the user's finger; and a controller for receiving the rotational information and sensing information, and controlling the mobile terminal based on the received rotational information and sensing information.

In one aspect of the invention, the sensing device comprises at least one sensing unit sending a signal to the controller when the user's finger is located at a predetermined position of the scroll key. In another aspect of the invention, the sensing device comprises a first sensing unit outputting a signal when the users finger is located at a first end of the scroll key, and a second sensing unit outputting a signal when the user's finger is located at a second end of the scroll key. Preferably, the first sensing unit and the second sensing unit are separated by a predetermined distance with a central portion of the scroll key in between, wherein the first sensing unit and the second sensing unit cannot output their respective signals when the user's finger is located on the central portion of the scroll key.

In a further aspect of the invention, the sensing device comprises at least one non-contact sensor provided near the scroll key, wherein the at least one non-contact sensor outputs a signal when the user's finger approaches the at least one non-contact sensor. In yet another aspect of invention, the sensing device comprises at least one touch sensor provided near the scroll key, wherein the at least one touch sensor outputs a signal when the user's finger touches the at least one touch sensor. Alternatively, the sensing device comprises at least one touch sensor provided at a predetermined position of the scroll key, wherein the at least one touch sensor outputs a signal when the user's finger touches the at least one touch sensor. Preferably, the sensing device comprises at least one switch provided below the scroll key, wherein the at least one switch outputs a signal when at least a portion of the scroll key is pressed.

Preferably, the controller moves a display cursor or output screen of the mobile terminal in one of a first direction, and a second direction opposite to the first direction, according to a rotational direction of the scroll key, when the controller receives the rotational information but not the sensing information. Preferably, the controller moves the display cursor or output screen of the mobile terminal in one of a third direction substantially perpendicular to the first direction, and a fourth direction opposite to the third direction, according to the rotational direction of the scroll key, when the controller receives the rotational information and the sensing information.

Preferably, the controller moves a display cursor or output screen of the mobile terminal in one of a first direction, and a second direction opposite to the first direction, according to a rotational direction of the scroll key, when the user's finger is located at a central portion of the scroll key. Preferably, the controller moves the display cursor or output screen of the mobile terminal in a third direction, substantially perpendicular to the first and second directions, when the user's finger is located at a first end of the scroll key, and moves the display cursor or output screen of the mobile terminal in a fourth direction opposite to the third direction, when the user's finger is located at a second end of the scroll key.

In accordance with another embodiment of the present invention, a mobile terminal comprises a housing, a display mounted in the housing, a rotatable scroll key mounted in the housing, the scroll key providing rotational information based on movement of the scroll key, a sensing device mounted in the housing near the scroll key, the sensing device sensing a position of a user's finger relative to the scroll key and providing sensing information based on the sensed position of the user's finger, and a controller for receiving the rotational information and sensing information, wherein the controller controls a cursor or output screen of the display based on the received rotational information and sensing information.

In one aspect of the invention, the sensing device comprises at least one non-contact sensor provided near the scroll key, wherein the at least one non-contact sensor outputs a signal when the user's finger approaches the at least one non-contact sensor. In another aspect of the invention, the sensing device comprises at least one touch sensor provided near the scroll key, wherein the at least one touch sensor outputs a signal when the user's finger touches the at least one touch sensor. Alternatively, the sensing device comprises at least one touch sensor provided at a predetermined position of the scroll key, wherein the at least one touch sensor outputs a signal when the user's finger touches the at least one touch sensor. Preferably, the sensing device comprises at least one switch provided below the scroll key, wherein the at least one switch outputs a signal when at least a portion of the scroll key is pressed.

Preferably, the controller outputs a control signal to move the display cursor or output screen in one of a first direction, and a second direction opposite to the first direction, according to a rotational direction of the scroll key, when the controller receives the rotational information but not the sensing information. Preferably, the controller outputs a control signal to move the display cursor or output screen in one of a third direction substantially perpendicular to the first direction, and a fourth direction opposite to the third direction, according to the rotational direction of the scroll key, when the controller receives the rotational information and the sensing information.

Preferably, the rotatable scroll key comprises a first end, a second end and a central portion between the first end and second end, and the sensing device comprises a first sensing unit outputting a signal when the user's finger is positioned on the first end, and a second sensing unit outputting a signal when the user's finger is positioned on the second end.

Preferably, the controller outputs a control signal to move the display cursor or output screen in one of a first direction, and a second direction opposite to the first direction, according to a rotational direction of the scroll key, when the user's finger is located at the central portion of the scroll key. Preferably, the controller outputs a control signal to move the display cursor or output screen in a third direction, substantially perpendicular to the first and second directions, when the user's finger is located at the first end of the scroll key, and outputs a control signal to move the display cursor or output screen in a fourth direction opposite to the third direction, when the user's finger is located at the second end of the scroll key.

In accordance with another embodiment of the present invention, a method for controlling a mobile terminal comprises detecting movement of a rotatable scroll key and providing rotational information based on the detected movement of the scroll key, detecting a position of a user's finger relative to the scroll key and providing position information based on the detected position of the user's finger, and controlling output contents of a mobile terminal display based on the rotational information and position information.

Preferably, controlling output contents of a mobile terminal display comprises moving a display cursor or output screen of the mobile terminal in one of a first direction, and a second direction opposite to the first direction, according to a rotational direction of the scroll key. Preferably, controlling output contents of a mobile terminal display comprises moving the display cursor or output screen of the mobile terminal in one of a third direction substantially perpendicular to the first direction, and a fourth direction opposite to the third direction, according to the rotational direction of the scroll key, when the user's finger is located at a predetermined position of the scroll key.

Preferably, controlling output contents of a mobile terminal display comprises moving a display cursor or output screen of the mobile terminal in one of a first direction, and a second direction opposite to the first direction, according to a rotational direction of the scroll key, when the user's finger is located at a central portion of the scroll key. Preferably, controlling output contents of a mobile terminal display comprises moving the display cursor or output screen of the mobile terminal in a third direction, substantially perpendicular to the first and second directions, when the user's finger is located at a first end of the scroll key, and moving the display cursor or output screen of the mobile terminal in a fourth direction opposite to the third direction, when the user's finger is located at a second end of the scroll key.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE PREFERRED EMBODIMENTS

The present invention relates to an input device for controlling a mobile communication terminal using a scroll key. Reference will now be made in detail to the preferred embodiments of the present invention, examples of which are illustrated in the accompanying drawings. Wherever possible, the same reference numbers will be used throughout the drawings to refer to the same or like parts.

An input device according to the present invention may be mounted and used in a mobile terminal such as a personal digital assistant (PDA), a mobile multimedia player, a mobile navigation device, or a mobile communication device, for example. Here, for convenience of description, an example in which the input device according to the present invention is used in the mobile communication device will be described.

Figure 1:
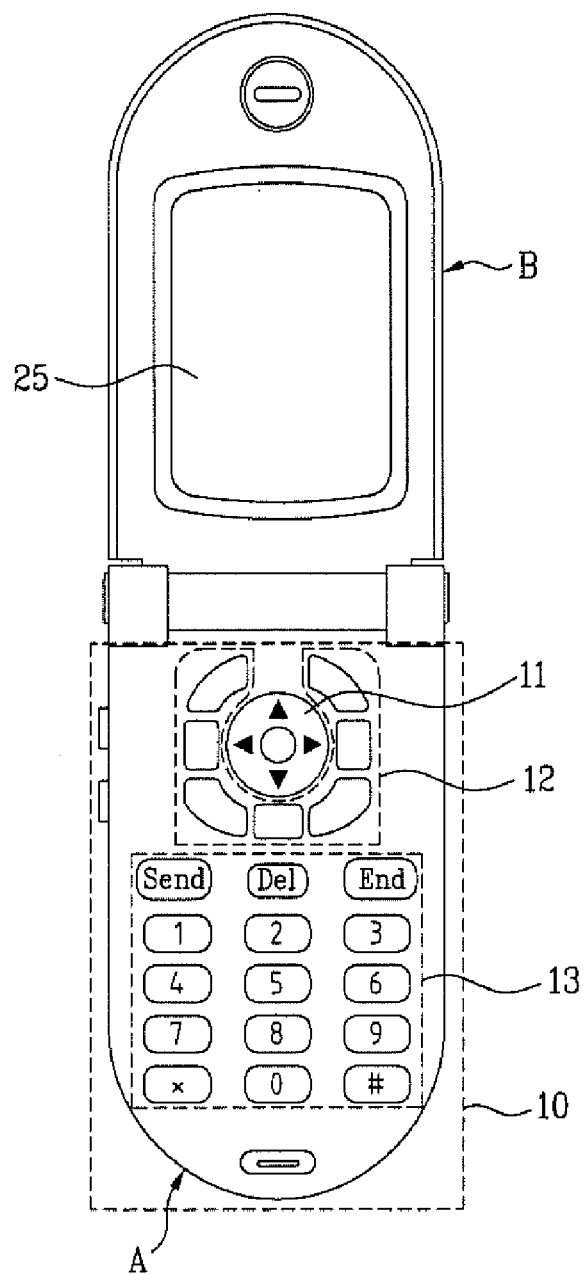
FIG. 1 a front view showing a general mobile communication device.
Figure 2:
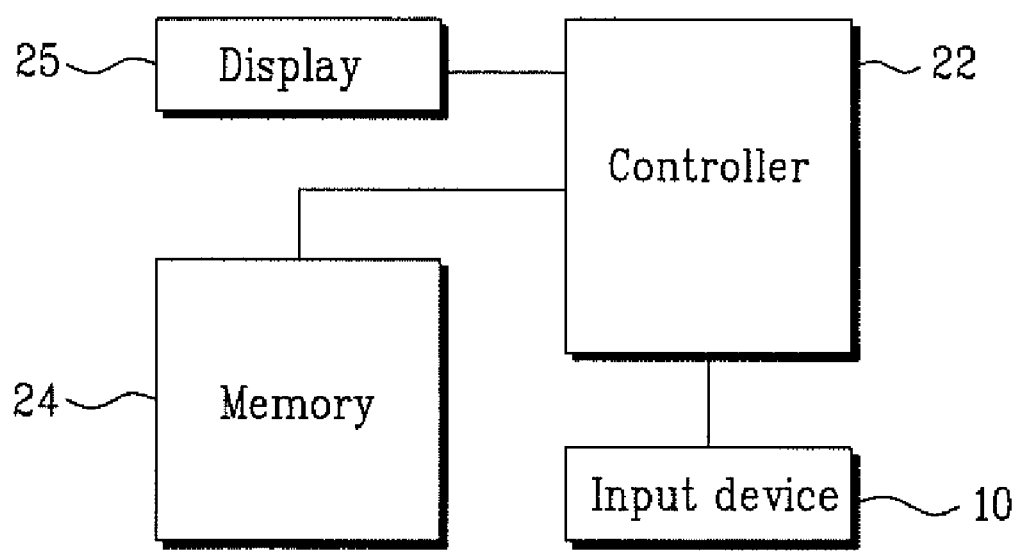
FIG. 2 is a schematic block diagram showing a configuration of the general mobile communication device.
Figure 3:
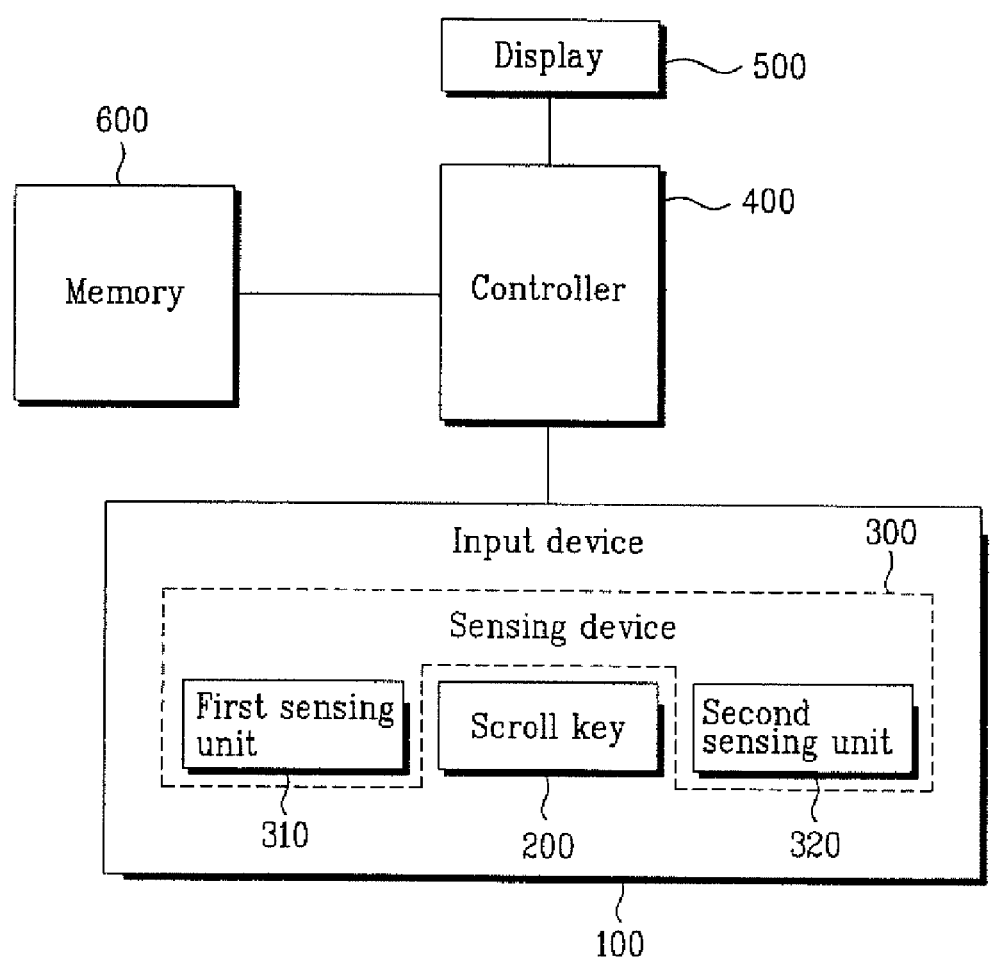
FIG. 3 is a schematic block diagram showing a configuration of a mobile communication device in accordance with one embodiment of the present invention.
Figure 4:
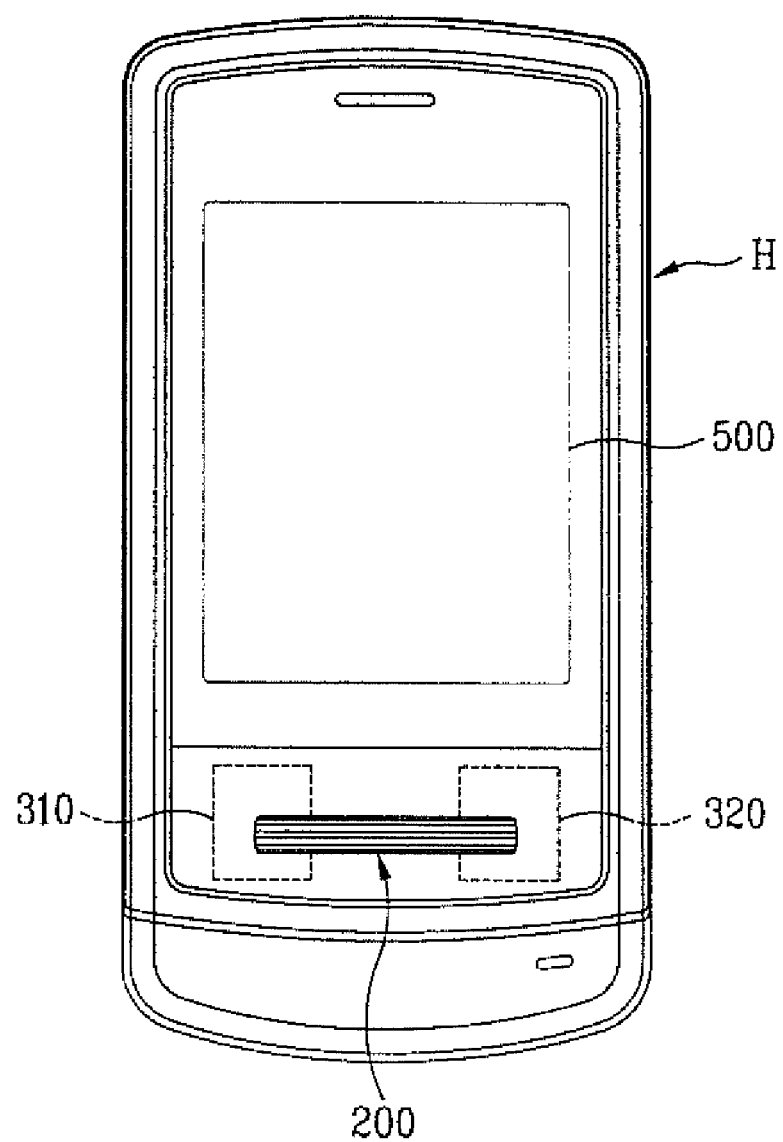
FIG. 4 is a front view showing a mobile communication device in accordance with one embodiment of the present invention.

FIG. 3 is a schematic block diagram showing a configuration of a mobile communication device in accordance with one embodiment of the present invention. FIG. 4 is a front view showing a mobile communication device in accordance with one embodiment of the present invention. Referring to FIGS. 3 and 4, the mobile communication device according to the present invention includes an input device 100, a display 500 for outputting visual information such as text, an image and a picture, a controller 400 for controlling the mobile communication device, a memory 600 for storing a variety of data and control programs, and a mobile communication signal processor (not shown) for transmitting/receiving a signal to/from a base station. If the input device 100 according to the present invention is used in another mobile terminal instead of the mobile communication device shown, the mobile communication signal processor may not be included.

Referring to FIG. 4, the above-described components are mounted in a housing H. The housing H may be implemented by a variety of devices, such as a simple bar-type device, a folder-type device, and a slide-type device in which two bodies can slide with respect to each other, for example. The housing H shown in FIG. 4 is a slide-type device.

The mobile communication signal processor includes a transmission/reception circuit including a transmission signal processor for processing and transmitting information input through the input device 100 and a reception signal processor for receiving and processing an external radio frequency signal, and an antenna for outputting the signal processed by the transmission signal processor in a radio frequency signal form and receiving a radio frequency signal.

The housing H includes a microphone and speaker for allowing the user to connect a call, in addition to the above-described components. The housing H may further include a camera for photographing a still picture or moving picture. Further, a battery for supplying power to the mobile communication device is detachably mounted in the housing H. Configurations of the display 500, the microphone, the speaker, the camera, the mobile communication signal processor, the battery, the controller 400 and the memory 600 are similar to those of a general mobile communication device. Thus, their detailed description will be omitted. Hereinafter, a configuration of the input device 100 according to the present invention will be described in detail.

The input device 100 in accordance with one embodiment of the present invention includes general character keys (not shown) for inputting numerals, characters and symbols. The input device 100 may also include general function keys (not shown) for executing functions such as a call origination, a call termination, a message confirmation, a phone number search and a camera function. The input device may further include a scroll key 200 and a sensing device 300 for sensing a position of the user's finger. Preferably, the controller 400 receives a signal from the scroll key 200 and the sensing device 300 and outputs a control signal for controlling the mobile communication device. The controller 400 is capable of performing a variety of functions and is illustrated in FIG. 3 to be independent of the input device 100 for convenience of description. However, in one aspect of the present invention, the controller 400 may also function as a component of the input device 100.

Figure 5:
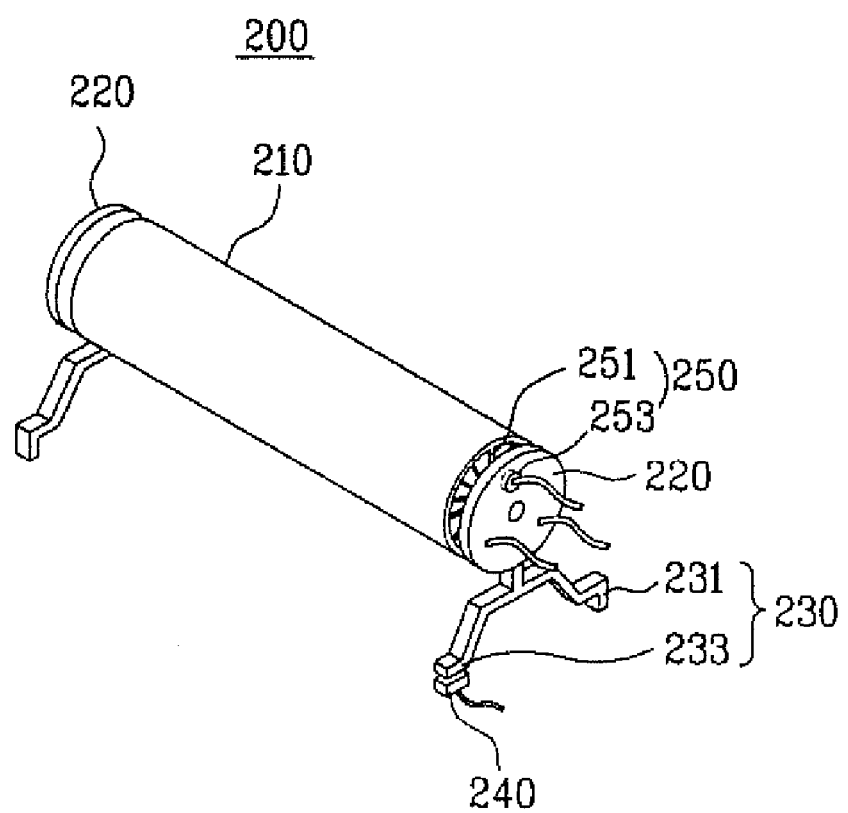
FIG. 5 is an exploded perspective view showing a scroll key of a mobile communication device in accordance with one embodiment of the present invention.

The scroll key 200 is mounted in the housing H at a predetermined position where the user can rotate the scroll key 200 while viewing the display 500. FIG. 4 shows an example in which the scroll key 200 is mounted on the same plane as the display 500. FIG. 5 shows a configuration of the scroll key 200. Referring to FIGS. 4 and 5, the scroll key 200 includes a roller 210, of which a portion is exposed from the housing H such that the roller 210 may be rotated by the user's finger. The roller 210 includes a sensor portion 250 for generating a signal when the roller 210 is rotated. Hereinafter, a configuration of the scroll key 200 will be described in detail.

FIG. 5 is an exploded perspective view showing the scroll key in accordance with one embodiment of the present invention. As shown in FIG. 5, the roller 210 of the scroll key 200 has an elongated cylindrical shape. Although not shown, a plurality of grooves for preventing the users finger from sliding may be formed on the outer surface of the roller 210. The roller 210 can be rotated in a first direction, and a second direction opposite to the first direction, by operation of the user.

The sensor portion 250 generates an electrical signal when the roller 210 is rotated. Preferably, the sensor portion 250 includes an encoder 251 provided on a side surface of the roller 210 at a predetermined angle and a sensor 253 facing the encoder 251. The sensor 253 may be an optical sensor including a light-emitting element and a light-receiving element. Accordingly, the sensor 253 emits light using the light-emitting element, and receives and converts the light reflected from the encoder 251 into an electrical signal.

A rotary shaft of the roller 210 may be directly and rotatably coupled to the housing H, or coupled to supporters 220, as shown in FIG. 5. The supporters 220 are provided at both sides of the roller 210 and support the roller 210 such that the roller 210 can be stably rotated. When the roller 210 is supported by the supporters 220, the sensor 253 of the sensor portion 250 is provided on one surface of the supporter 220 opposed to the encoder 251 included in the roller 210.

The supporters 220 may be directly connected to the housing H or elastically supported by elastic legs 230, as shown in FIG. 5. The legs 230 each include a first leg 231 and a second leg 233, which branch off an extension portion extending from each supporter 220. The first leg 231 and second leg 233 respectively include elastic bending portions. When the supporters 220 are supported by the elastic legs 230, the roller 210 may be elastically pressed by the user's finger and returned to an original position when the user rotates the roller 210 of the scroll key 200. Accordingly, the user is provided with improved operability.

A switch 240 for generating a signal when the roller 210 is pressed by the user may be provided on a lower surface of one of the supporters 220. Accordingly, an end of the second leg 233 may not be fixed to the housing H (free end) such that the switch 240 is provided below the free end of the second leg 233, as shown in FIG. 5.

Preferably, when the user presses the roller 210, the supporter 220 moves downward together with the roller 210 causing the free end of the second leg 233 to press the switch 240. When the switch 240 is pressed, an electrical signal is sent to the controller 400.

Preferably, when the switching signal is sent to the controller 400, the controller 400 executes a menu function on which a display cursor is positioned at a time when the switching signal is received. Accordingly, the roller 210 of the scroll key 200 and the switch 240 may function as a confirmation key.

The sensing device 300 senses the position of the user's finger rotating the scroll key 200, and more particularly, the roller 210. Preferably, the sensing device 300 includes at least one sensing unit for sending an electrical signal to the controller 400 when the user's finger is at a predetermined position with respect to the scroll key 200.

For example, when one sensing unit is provided on one end of the scroll key 200, or in the vicinity thereof, and the user's finger approaches or touches one end of the scroll key 200 to rotate the scroll key 200, the sensing unit outputs the electrical signal to the controller 400. Alternatively, when several sensing units are provided on the scroll key 200, or in the vicinity thereof, and the user's finger approaches or touches a portion of the scroll key 200 to rotate the scroll key 200, the sensing unit provided on the touched portion, or in the vicinity thereof, outputs the electrical signal to the controller 400.

The sensing device 300 including the sensing unit may be implemented in a variety of forms as shown in FIGS. 3, 4, 6 and 7. Hereinafter, embodiments of the sensing device will be described in detail with reference to the drawings.

Referring to FIGS. 3 and 4, in accordance with one embodiment of the present invention, the sensing device 300 comprises a first sensing unit 310 and a second sensing unit 320 respectively provided at ends of the scroll key 200. The first sensing unit 310 and the second sensing unit 320 may be touch sensors, for example. Preferably, the first sensing unit 310 is mounted in the housing H in the vicinity of a first end (left end) of the scroll key 200, and outputs an electrical signal to the controller 400 when the user's finger is positioned at the first end (left end). Accordingly, the second sensing unit 320 is mounted in the housing H in the vicinity of a second end (right end) of the scroll key 200, and outputs an electrical signal to the controller 400 when the user's finger is positioned at the second end (right end).

The first sensing unit 310 and the second sensing unit 320 are preferably separated from each other by a predetermined distance with a central portion of the scroll key 200 interposed there between. By this structure, the first sensing unit 310 and the second sensing unit 320 are prevented from respectively outputting an electrical signal when the user's finger is positioned on the central portion of the scroll key 200.

When the user's finger is positioned on the central portion of the scroll key 200, the sensing device 300 does not send positional information regarding the user's finger to the controller 400. Accordingly, when the controller 400 receives rotational information regarding the scroll key 200 without receiving the positional information of the user's finger from the sensing device 300, the controller 400 determines that the user's finger is positioned on the central portion of the scroll key 200 and generates a control signal corresponding thereto.

Alternatively, although not shown, a third sensing unit may be provided between the first sensing unit 310 and the second sensing unit 320. When the user's finger is positioned on the central portion of the scroll key 200, the third sensing unit sends an electrical signal to the controller 400. Thus, the controller 400 determines that the user's finger is positioned on the central portion of the scroll key 200 and generates a control signal corresponding thereto.

In accordance with one embodiment of the present invention, the sensing device 300 may include at least one non-contact type sensor. That is, at least one of the first sensing unit 310 and the second sensing unit 320 may include a non-contact type sensor for generating an electrical signal when an object approaches the sensor without contact. In this case, when the user rotates the scroll key 200 in a state in which the user's finger is positioned on the left end or right end of the scroll key 200, the user's finger approaches the first sensing unit 310 or the second sensing unit 320. Accordingly, the first sensing unit 310 or the second sensing unit 320 outputs the electrical signal to the controller 400. The controller 400 can then accurately determine the position of the user's finger and output a control signal corresponding thereto.

The non-contact type sensor and the touch sensor may be a capacitive sensor or an optical sensor. Since these sensors are widely used and those skilled in the art can sufficiently implement the present invention through the above description, the detailed description of the configurations of the sensors will be omitted.

Figure 6:
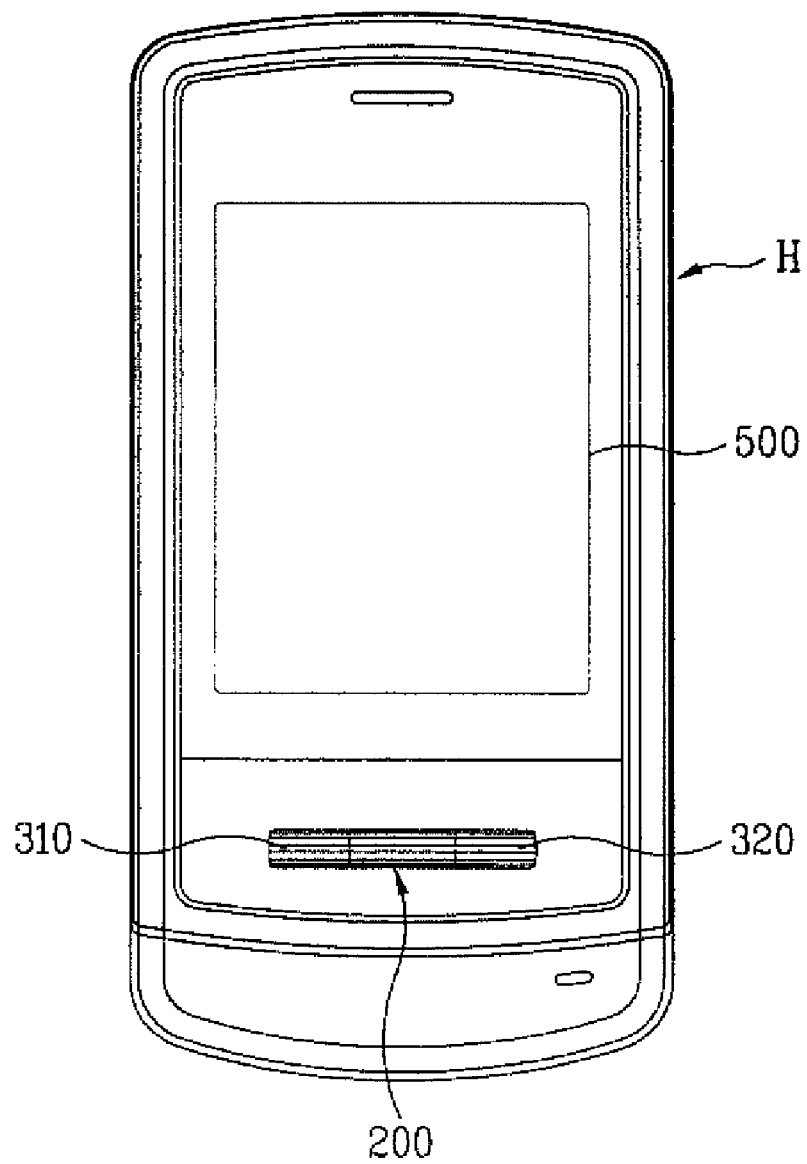
FIG. 6 is a front view showing a mobile communication device in accordance with another embodiment of the present invention.

In accordance with another embodiment of the present invention, the sensing device 300 is not mounted in the housing H in the vicinity of the scroll key 200. Rather, the sensing device 300 is provided in the scroll key 200. FIG. 6 is a front view showing a mobile communication device in accordance with another embodiment of the present invention.

Referring to FIGS. 3 and 6, the sensing device 300 may include a touch sensor for outputting a signal when the user's finger touches the sensor. Alternatively, the sensing device 300 may include a non-contact type sensor for outputting a signal when the user's finger approaches the sensor. Preferably, the first sensing unit 310 and the second sensing unit 320, configuring the sensing device 300, are respectively mounted in the first and second ends (left and right ends) of the scroll key 200. Preferably, the central portion of the scroll key 200 is positioned between the first sensing unit 310 and the second sensing unit 320, and electrically insulates the two sensing units. Furthermore, the central portion of the scroll key 200 rotates in connection with the first sensing unit 310 and second sensing unit 320.

Accordingly, when the user rotates the scroll key 200 in a state in which the user's finger is positioned on any one of the first sensing unit 310 and the second sensing unit 320, positional information of the finger sensed by the sensing device 300 and rotational information of the scroll key 200 are sent to the controller 400.

Figure 7:
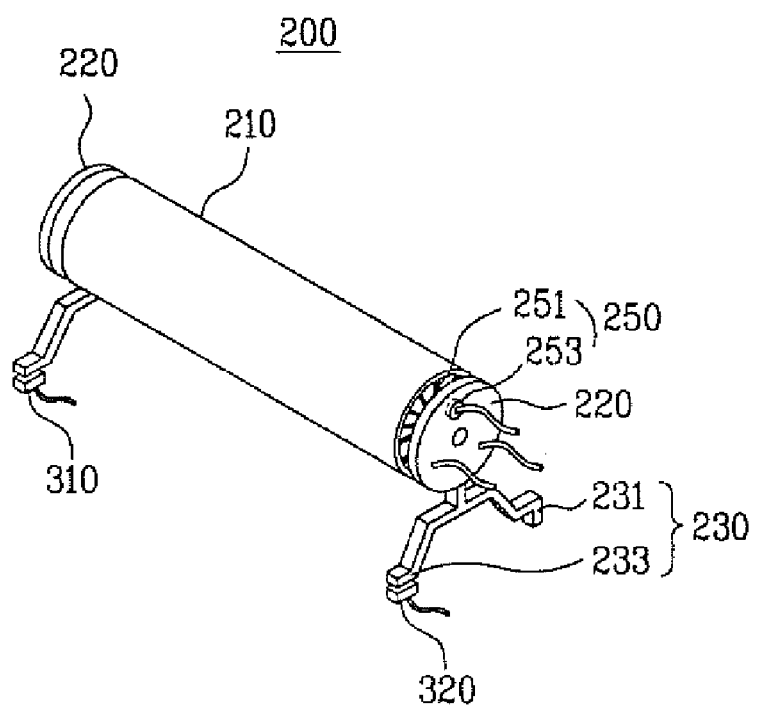
FIG. 7 is an exploded perspective view showing a scroll key of a mobile communication device in accordance with another embodiment of the present invention.

In accordance with one embodiment of the present invention, the sensing device 300 may be implemented by a pressing switch. FIG. 7 is an exploded perspective view of a scroll key of a mobile communication device implementing a pressing switch in accordance with another embodiment of the present invention.

Referring to FIGS. 3 and 7, the first sensing unit 310 and the second sensing unit 320, configuring the sensing device 300, are pressing switches. Accordingly, in this embodiment, the switch 240 described above with respect to FIG. 5 functions as the second sensing unit 320. The first sensing unit 310 is provided below a first end (left end) of the scroll key 200, and the second sensing unit 320 is provided below a second end (right end) of the scroll key 200. Free ends of the second legs 233 are provided above the first sensing unit 310 and the second sensing unit 320, respectively.

When the user rotates the scroll key 200 in a state in which the left end of the scroll key 200 is lightly pressed with the user's finger, the roller 210 is rotated in a state in which the first sensing unit 310 is pressed by the free end of the second leg 233. Accordingly, while the roller 210 is rotated, both the first sensing unit 310 and the sensor portion 250 of the scroll key 200 generate electrical signals. Thus, the controller 400 may receive positional information regarding the user's finger from the first sensing unit 310 and rotational information from the sensor portion 250.

Similarly, when the user rotates the scroll key 200 in a state in which the right end of the scroll key 200 is lightly pressed with the user's finger, the roller 210 is rotated in a state in which the second sensing unit 320 is pressed by the free end of the second leg 233. Accordingly, while the roller 210 is rotated, both the second sensing unit 320 and the sensor portion 250 of the scroll key 200 generate electrical signals. Thus, the controller 400 may receive positional information regarding the user's finger from the second sensing unit 320 and the rotational information from sensor portion 250.

When the user rotates the scroll key 200 in a state in which the central portion of the scroll key 200 is not pressed with the user's finger, the roller 210 is rotated in a state in which the first sensing unit 310 and the second sensing unit 320 are not pressed. Hence, the controller 400 receives an electrical signal from the scroll key 200 without receiving a signal from the sensing device 300. Accordingly, the controller 400 determines that the user's finger is positioned on the central portion of the scroll key 200 and outputs a control signal corresponding thereto.

In accordance with the present invention, if the user uses the input device 100 when the device executes a predetermined mode, such as a menu selection mode for allowing the user to select any one of a variety of functions, or a file viewer mode for allowing the user to view an image file or text file, the cursor can be conveniently moved in all directions such that a desired menu is executed, or a screen can be moved in all directions such that a portion of a large image file or text file previously not shown on a display can be viewed. In accordance with the present invention, the user can rotate the scroll key 200 without pressing directional keys to move the screen or the cursor on the display 500 in all directions. Preferably, directional movement of the cursor or the screen is determined by the position of the user's finger sensed by the sensing device 300. Directional movement may also be determined by the rotational direction of the scroll key 200. Movement distances of the cursor or the screen may be determined by a rotation angle of the scroll key 200.

A method of controlling a mobile device according to the present invention includes detecting whether the user's finger is positioned on a predetermined portion of the scroll key 200, and controlling operation of the device, and more particularly, output contents of the display 500, based on the positional information of the user's finger and the rotational information of the scroll key 200. Hereinafter, a method of controlling the mobile device in accordance with one embodiment of the present invention will be described in detail, wherein the mobile device is controlled according to the input device 100 and signals sent from the sensing device 300 and the scroll key 200 to the controller 400.

Preferably, when the user rotates the scroll key 200, the sensor portion 250 generates and sends an electrical signal according to the rotation of the roller 210. Thus, rotational information regarding the scroll key 200 is sent to the controller 400. As described above, positional information regarding the user's finger is sent to the controller 400 by the sensing device 300.

When the controller 400 receives the rotational information from the scroll key 200 without receiving a signal from the sensing device 300, the controller 400 outputs a control signal for moving an output screen or cursor located on the display 500 of the mobile device in a first direction, or second direction opposite to the first direction, according to a rotational direction of the scroll key 200. For example, the first direction may be an upper direction and the second direction may be a lower direction.

Figure 8:
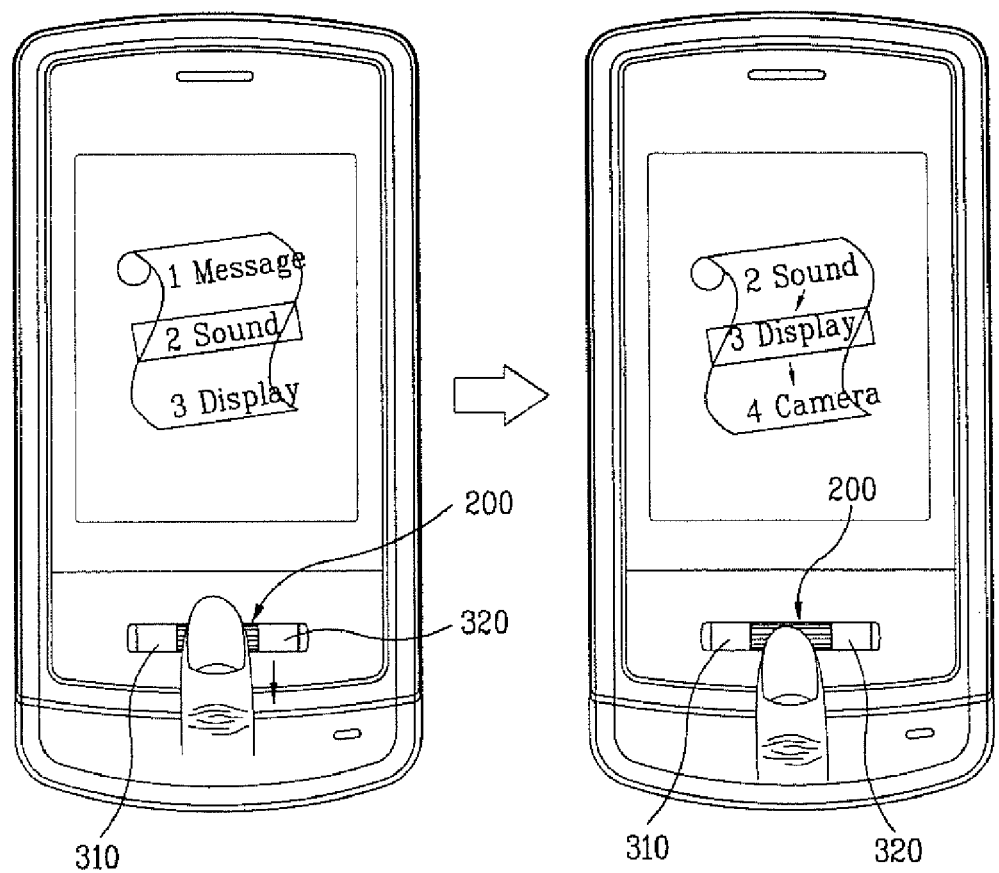
FIGS. 8 and 9 are diagrams showing examples of methods for using an input device of a mobile communication device in accordance with embodiments of the present invention.

For example, referring to FIG. 8, when the user rotates the scroll key 200 in the second direction (lower direction) in a state in which the user's finger is positioned on a central portion of the scroll key 200, the controller 400 outputs a control signal for moving the output screen or cursor in the second direction (lower direction). Accordingly, the output screen or cursor located on the display 500 is moved in the second direction (lower direction) according to the control signal of the controller 400. As shown in FIG. 8, the user rotates the scroll key 200 downward in order to move the cursor positioned on a second menu item to a third menu item.

Similarly, although not shown, when the user rotates the scroll key 200 in the first direction (upper direction) in a state in which the user's finger is positioned on the central portion of the scroll key 200, the controller 400 moves the output screen or cursor on the display 500 in the upper direction.

In accordance with the present invention, if the user's finger is not positioned on a predetermined portion of the scroll key 200, for example, either end of the scroll key 200, the sensing device 300 does not sense the user's finger, and therefore does not output a signal. Thus, the output screen or the cursor on the display 500 is moved in the upper direction or the lower direction according to the rotational direction of the scroll key 200 only.

However, when the user's finger is positioned on the predetermined portion of the scroll key 200, such as either end of the scroll key 200, the sensing device 300 can sense the user's finger and generate a corresponding signal. Accordingly, the signal of the sensing device 300 and the rotational information of the scroll key 200 are sent to the controller 400, wherein the controller 400 outputs a control signal for moving the output screen or cursor on the display 500 in a third direction or fourth direction. Preferably, the third direction is substantially perpendicular to the first and second directions, and the fourth direction is opposite to the third direction. For example, the third direction may be a left direction and the fourth direction may be a right direction. Thus, according to the rotational direction of the scroll key 200, the screen or cursor may be moved in the left or right direction.

In accordance with the present invention, the sensor device 300 may output the same signal regardless of whether the user's finger is positioned at a left end or right end of the scroll key 200. Preferably, the sensing device 300 outputs different signals according to the rotational direction of the scroll key 200.

For example, when the scroll key 200 is rotated in the first direction (upper direction) in a state in which the user's finger is positioned at either the left end or right end of the scroll key 200, the controller 400 outputs a control signal for moving the screen or cursor in the third direction (left direction). Accordingly, the screen or the cursor is moved in the left direction according to the control signal of the controller 400. Similarly, when the scroll key 200 is rotated in the second direction (lower direction) in a state in which the user's finger is positioned at either the left end or right end of the scroll key 200, the controller 400 outputs a control signal for moving the screen or cursor in the fourth direction (right direction). Thus, the screen or cursor is moved in the right direction according to the control signal of the controller 400.

In accordance with the present invention, when the scroll key 200 is rotated in a state in which the user's finger is positioned on a portion of the scroll key 200 where the users finger cannot be sensed by the sensing device 300, the screen or cursor is moved in the upper direction or lower direction according to the rotational direction of the scroll key 200. However, when the scroll key 200 is rotated in a state in which the user's finger is positioned on a portion of the scroll key 200 where the finger can be sensed by the sensing device 300, the screen or cursor is moved in the left direction or right direction according to the rotational direction of the scroll key 200.

Notably, the method of controlling the mobile device according to the present invention is not limited to the above examples. In accordance with another embodiment of the present invention, when the users finger is positioned at a portion of the scroll key 200 where the user's finger can be sensed by the sensing device 300, the mobile device may be controlled such that the movement direction of the screen or cursor is determined by the position of the user's finger independent of the rotational direction of the scroll key 200. Preferably, the sensing device 300 outputs different signals when the user's finger is respectively positioned on the first end and the second end of the scroll key 200.

For example, when the scroll key 200 is rotated in a state in which the user's finger is positioned on the central portion of the scroll key 200, the screen or cursor is controlled to be moved in the upper direction or lower direction according to the rotational direction of the scroll key 200, and described above. However, when the scroll key 200 is rotated in a state in which the user's finger is positioned on the first end (left end) of the scroll key 200, the first sensing unit 310 generates a signal corresponding thereto. Thereafter, the signal generated by the first sensing unit 310, as well as a signal generated by the sensor portion 250 are sent to the controller 400. Based on the signal received from the first sensing unit 310, the controller 400 determines the movement direction of the screen or cursor to be the third direction (left direction) regardless of the rotational direction of the scroll key 200. Accordingly, the controller 400 may output a control signal such that the screen or cursor is moved in the left direction.

Figure 9:
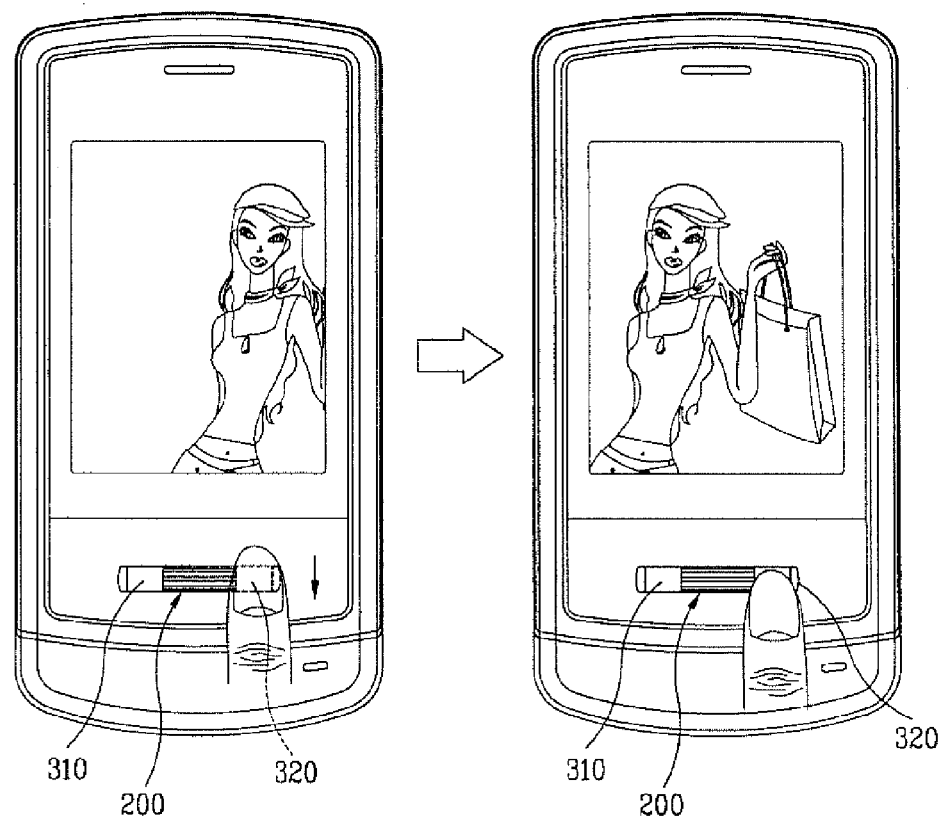

When the scroll key 200 is rotated in a state that the user's finger is positioned on the second end (right end) of the scroll key 200, as shown in FIG. 9, the second sensing unit 320 generates a signal corresponding thereto. Thereafter, the signals generated by the second sensing unit 320 and the sensor portion 250 are sent to the controller 400. Based on the signal received from the second sensing unit 320, the controller 400 determines the movement direction of the screen or cursor to be the fourth direction (right direction) regardless of the rotational direction of the scroll key 200. Accordingly, the controller 400 may output a control signal such that the screen or cursor is moved in the right direction, as shown in FIG. 9.

As described above, according to the present invention, the movement direction of the screen or cursor displayed on the display 500 is determined by the position of the user's finger on the scroll key 200, and the rotational direction of the scroll key 200. The movement direction of the scroll key 200 is determined by the rotational angle of the scroll key 200. Accordingly, the user may use the scroll key 200 to move the screen or cursor in left, right, upper and lower directions, without pressing directional keys.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An input device for a mobile terminal, the input device comprising:
    a rotatable scroll key providing rotational information based on movement of the scroll key;
    a sensing device for sensing a position of a user's finger on the scroll key along a longitudinal direction of a rotational axis of the scroll key and providing sensing information based on the sensed position of the user's finger along the longitudinal direction of the rotational axis of the scroll key; and
    a controller for receiving the rotational information and sensing information, and controlling the mobile terminal based on the received rotational information and sensing information,
    wherein the sensing device comprises at least one sensing unit sending a signal to the controller when the user's finger is located at a predetermined position of the scroll key,
    wherein the controller moves a display cursor or output screen of the mobile terminal in one of a first direction, and a second direction opposite to the first direction, according to a rotational direction of the scroll key, when the controller receives the rotational information but not the sensing information, and
    wherein the controller moves the display cursor or output screen of the mobile terminal in a direction different from the first and second directions according to the rotational direction of the scroll key, when the sensing device senses the user's finger at the predetermined position of the scroll key while the scroll key is rotated, and the controller receives the rotational information and the sensing information.

2. The input device of claim 1, wherein the sensing device comprises:
    a first sensing unit outputting a signal when the user's finger is located at a first end of the scroll key; and
    a second sensing unit outputting a signal when the user's finger is located at a second end of the scroll key.

3. The input device of claim 2, wherein the first sensing unit and the second sensing unit are separated by a predetermined distance with a central portion of the scroll key in between, wherein the first sensing unit and the second sensing unit cannot output their respective signals when the user's finger is located on the central portion of the scroll key.

4. The input device of claim 1, wherein the sensing device comprises at least one non-contact sensor provided near the scroll key, wherein the at least one non-contact sensor outputs a signal when the user's finger approaches the at least one non-contact sensor.

5. The input device of claim 1, wherein the sensing device comprises at least one touch sensor provided near the scroll key, wherein the at least one touch sensor outputs a signal when the user's finger touches the at least one touch sensor.

6. The input device of claim 1, wherein the sensing device comprises at least one touch sensor provided at the predetermined position of the scroll key, wherein the at least one touch sensor outputs a signal when the user's finger touches the at least one touch sensor.

7. The input device of claim 1, wherein the sensing device comprises at least one switch provided below the scroll key, wherein the at least one switch outputs a signal when at least a portion of the scroll key is pressed.

8. The input device of claim 1, wherein the controller moves the display cursor or output screen of the mobile terminal in one of a third direction substantially perpendicular to the first direction, and a fourth direction opposite to the third direction, according to the rotational direction of the scroll key, when the controller receives the rotational information and the sensing information.

9. The input device of claim 1, wherein the controller moves the display cursor or output screen of the mobile terminal in one of the first direction, and the second direction opposite to the first direction, according to the rotational direction of the scroll key, when the user's finger is located at a central portion of the scroll key.

10. The input device of claim 9, wherein the controller moves the display cursor or output screen of the mobile terminal in a third direction, substantially perpendicular to the first and second directions, when the user's finger is located at a first end of the scroll key, and moves the display cursor or output screen of the mobile terminal in a fourth direction opposite to the third direction, when the user's finger is located at a second end of the scroll key.

11. A mobile terminal, comprising:
a housing;
a display mounted in the housing;
a rotatable scroll key mounted in the housing, the scroll key providing rotational information based on movement of the scroll key;
a sensing device mounted in the housing near the scroll key, the sensing device sensing a position of a user's finger on the scroll key along a longitudinal direction of a rotational axis of the scroll key and providing sensing information based on the sensed position of the user's finger along the longitudinal direction of the rotational axis of the scroll key; and
a controller for receiving the rotational information and sensing information, wherein the controller controls a display cursor or output screen of the mobile terminal based on the received rotational information and sensing information,
wherein the sensing device comprises at least one non-contact sensor provided near the scroll key, wherein the at least one non-contact sensor outputs a signal when the user's finger approaches the at least one non-contact sensor,
wherein the controller moves the display cursor or output screen of the mobile terminal in one of a first direction, and a second direction opposite to the first direction, according to a rotational direction of the scroll key, when the controller receives the rotational information but not the sensing information, and
wherein the controller moves the display cursor or output screen of the mobile terminal in a direction different from the first and second directions according to the rotational direction of the scroll key, when the sensing device senses the user's finger at a predetermined position of the scroll key while the scroll key is rotated, and the controller receives the rotational information and the sensing information.

12. The mobile terminal of claim 11, wherein the sensing device comprises at least one touch sensor provided near the scroll key, wherein the at least one touch sensor outputs a signal when the user's finger touches the at least one touch sensor.

13. The mobile terminal of claim 11, wherein the sensing device comprises at least one touch sensor provided at the predetermined position of the scroll key, wherein the at least one touch sensor outputs a signal when the user's finger touches the at least one touch sensor.

14. The mobile terminal of claim 11, wherein the sensing device comprises at least one switch provided below the scroll key, wherein the at least one switch outputs a signal when at least a portion of the scroll key is pressed.

15. The mobile terminal of claim 11, wherein the controller outputs a control signal to move the display cursor or output screen in one of a third direction substantially perpendicular to the first direction, and a fourth direction opposite to the third direction, according to the rotational direction of the scroll key, when the controller receives the rotational information and the sensing information.

16. The mobile terminal of claim 11, wherein:
the rotatable scroll key comprises a first end, a second end and a central portion between the first end and second end; and
the sensing device comprises a first sensing unit outputting a signal when the user's finger is positioned on the first end, and a second sensing unit outputting a signal when the user's finger is positioned on the second end.

17. The mobile terminal of claim 16, wherein the controller outputs a control signal to move the display cursor or output screen in one of the first direction, and the second direction opposite to the first direction, according to the rotational direction of the scroll key, when the user's finger is located at the central portion of the scroll key.

18. The mobile terminal of claim 17, wherein the controller outputs a control signal to move the display cursor or output screen in a third direction, substantially perpendicular to the first and second directions, when the user's finger is located at the first end of the scroll key, and outputs a control signal to move the display cursor or output screen in a fourth direction opposite to the third direction, when the user's finger is located at the second end of the scroll key.

19. A method for controlling a mobile terminal, the method comprising:
detecting movement of a rotatable scroll key and providing rotational information based on the detected movement of the scroll key;
detecting a position of a user's finger on the scroll key along a longitudinal direction of a rotational axis of the scroll key and providing position information based on the detected position of the user's finger along the longitudinal direction of the rotational axis of the scroll key; and
controlling output contents of a mobile terminal display based on the rotational information and position information, wherein controlling output contents of the mobile terminal display comprises moving a display cursor or output screen of the mobile terminal in one of a first direction, and a second direction opposite to the first direction, according to a rotational direction of the scroll key, and wherein controlling output contents of the mobile terminal display comprises moving the display cursor or output screen of the mobile terminal in a direction different from the first and second directions according to the rotational direction of the scroll key and the detected position of the user's finger while the scroll key is rotated.

20. The method of claim 19, wherein controlling output contents of the mobile terminal display comprises moving the display cursor or output screen of the mobile terminal in one of a third direction substantially perpendicular to the first direction, and a fourth direction opposite to the third direction, according to the rotational direction of the scroll key, when the user's finger is located at a predetermined position of the scroll key.

21. The method of claim 19, wherein controlling output contents of the mobile terminal display comprises moving the display cursor or output screen of the mobile terminal in one of the first direction, and the second direction opposite to the first direction, according to the rotational direction of the scroll key, when the user's finger is located at a central portion of the scroll key.

22. The method of claim 21, wherein controlling output contents of the mobile terminal display comprises moving the display cursor or output screen of the mobile terminal in a third direction, substantially perpendicular to the first and second directions, when the user's finger is located at a first end of the scroll key, and moving the display cursor or output screen of the mobile terminal in a fourth direction opposite to the third direction, when the user's finger is located at a second end of the scroll key.

* * * * *